United States Patent

Thoma

(10) Patent No.: US 10,448,164 B2
(45) Date of Patent: *Oct. 15, 2019

(54) ACOUSTIC PLAYBACK OF A DIGITAL AUDIO MEDIUM IN A MOTOR VEHICLE

(71) Applicant: Bayerische Motoren Werke Aktiengesellschaft, Munich (DE)

(72) Inventor: Stephan Thoma, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,364

(22) Filed: Aug. 24, 2018

(65) Prior Publication Data

US 2018/0367903 A1     Dec. 20, 2018

Related U.S. Application Data

(63) Continuation of application No. PCT/EP2017/053898, filed on Feb. 21, 2017.

(30) Foreign Application Priority Data

Feb. 25, 2016   (DE) .......................... 10 2016 202 968

(51) Int. Cl.
*H04R 5/04* (2006.01)
*B60K 37/06* (2006.01)
(Continued)

(52) U.S. Cl.
CPC ............... *H04R 5/04* (2013.01); *B60K 37/06* (2013.01); *G08G 1/096708* (2013.01);
(Continued)

(58) Field of Classification Search
CPC .. H04R 5/04; H04R 2430/01; H04R 2420/01; G08G 1/096872; G08G 1/096708
(Continued)

(56) References Cited

U.S. PATENT DOCUMENTS

| 2003/0181822 A1 | 9/2003 | Victor | |
| 2006/0114757 A1* | 6/2006 | Theimer | G09B 5/06 |
| | | | 369/30.01 |

(Continued)

FOREIGN PATENT DOCUMENTS

| DE | 103 22 458 A1 | 12/2004 |
| JP | 7-142946 A | 6/1995 |

(Continued)

OTHER PUBLICATIONS

International Search Report (PCT/ISA/210) issued in PCT Application No. PCT/EP2017/053861 dated May 18, 2017 with English translation (five pages).

(Continued)

*Primary Examiner* — Melur Ramakrishnaiah
(74) *Attorney, Agent, or Firm* — Crowell & Moring LLP

(57) ABSTRACT

A method is provided for the acoustic playback of a digital audio medium, in particular an audio book, in a motor vehicle, in particular a two- or four-wheeled motor vehicle, at least one sensor, more particularly at least one velocity-, force- or acceleration sensor, used to detect driving parameters of the motor vehicle, being provided in or on the motor vehicle. For the user-friendly playback of a digital audio medium in a motor vehicle: in a first step a first comparison is carried out as to whether the driving parameters detected by the at least one sensor characterize a section of road requiring a higher degree of alertness on the part of the driver of the motor vehicle. If the first comparison is positive, the playback of the audio medium is interrupted in a second step. In a third step, a second comparison is carried out as to whether the driving parameters detected by the at least one sensor characterize a section of road requiring a higher degree of alertness on the part of the driver of the motor vehicle. If the second comparison is positive, the playback of the audio medium is still interrupted in a fourth (Continued)

step. Finally, if the second comparison is negative, the playback of the audio medium is resumed in a fifth step.

13 Claims, 1 Drawing Sheet

(51) Int. Cl.
*G08G 1/0967* (2006.01)
*G08G 1/0968* (2006.01)
*G01C 21/36* (2006.01)

(52) U.S. Cl.
CPC .. *G08G 1/096872* (2013.01); *B60K 2370/195* (2019.05); *G01C 21/3697* (2013.01); *H04R 2420/01* (2013.01); *H04R 2430/01* (2013.01)

(58) Field of Classification Search
USPC .......................................... 381/86, 72, 74.1
See application file for complete search history.

(56) References Cited

U.S. PATENT DOCUMENTS

| | | |
|---|---|---|
| 2007/0182529 A1 | 8/2007 | Dobler et al. |
| 2011/0161006 A1* | 6/2011 | Deurwaarder ....... G06Q 20/102 701/408 |
| 2013/0165165 A1* | 6/2013 | Macek ................. H04W 48/04 455/466 |
| 2015/0051752 A1 | 2/2015 | Paszkowicz |
| 2015/0099495 A1 | 4/2015 | Crosbie et al. |
| 2015/0253146 A1 | 9/2015 | Annapureddy et al. |

FOREIGN PATENT DOCUMENTS

| | | |
|---|---|---|
| JP | 8-105753 A | 4/1996 |
| JP | 8-313284 A | 11/1996 |
| WO | WO 2015/086302 A1 | 6/2015 |
| WO | WO 2015/184578 A1 | 12/2015 |

OTHER PUBLICATIONS

German-language Written Opinion (PCT/ISA/237) issued in PCT Application No. PCT/EP2017/053861 dated May 18, 2017 (six pages).

German-language Search Report issued in counterpart German Application No. 10 2016 202 966.5 dated Feb. 9, 2017 with partial English translation (15 pages).

International Search Report (PCT/ISA/210) issued in PCT Application No. PCT/EP2017/053898 dated Jun. 7, 2017 with English translation (five pages).

German-language Written Opinion (PCT/ISA/237) issued in PCT Application No. PCT/EP2017/053898 dated Jun. 7, 2017 (five pages).

German-language Search Report issued in counterpart German Application No. 10 2016 202 968.1 dated Feb. 9, 2017 with partial English translation (12 pages).

* cited by examiner

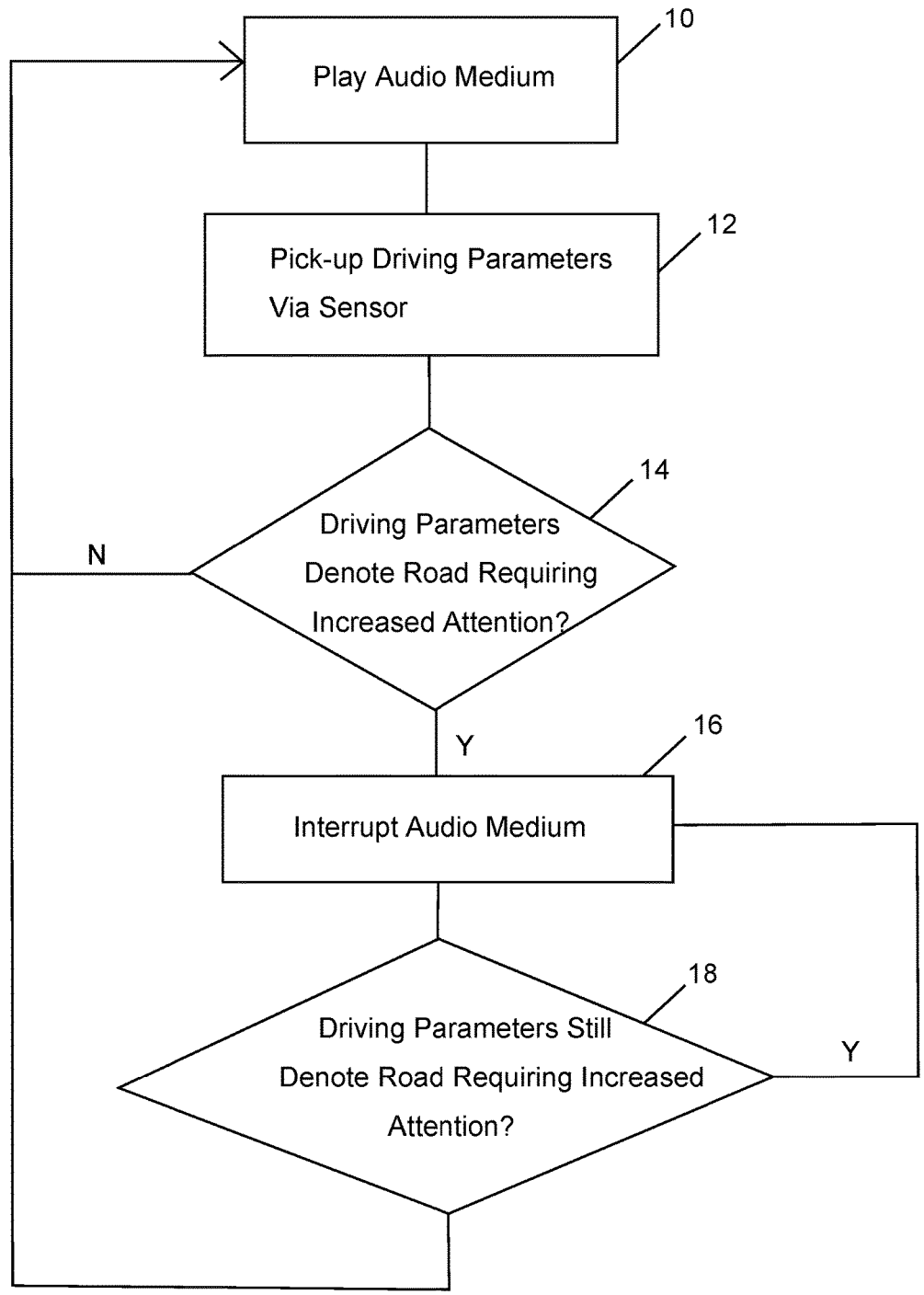

ACOUSTIC PLAYBACK OF A DIGITAL AUDIO MEDIUM IN A MOTOR VEHICLE

CROSS REFERENCE TO RELATED APPLICATIONS

This application is a continuation of PCT International Application No. PCT/EP2017/053898, filed Feb. 21, 2017, which claims priority under 35 U.S.C. § 119 from German Patent Application No. 10 2016 202 968.1, filed Feb. 25, 2016, the entire disclosures of which are herein expressly incorporated by reference.

This application contains subject matter related to U.S. application Ser. No. 16/111,337, entitled "Acoustic Reproduction of a Digital Audio Medium in a Motor Vehicle" filed on even date herewith.

BACKGROUND AND SUMMARY OF THE INVENTION

The invention relates in particular to a method for acoustic reproduction of a digital audio medium, in particular an audio book, in a motor vehicle, in particular a two- or four-wheeled motor vehicle, wherein the motor vehicle has at least one sensor provided in or on it for picking up driving parameters of the motor vehicle, such as in particular at least one speed, force or acceleration sensor.

Known methods for reproducing a digital audio medium in a motor vehicle are not very user friendly.

The object of the invention is, in particular, to provide a method for user friendly reproduction of a digital audio medium in a motor vehicle.

This object is achieved in particular by a method for acoustically reproducing a digital audio medium, in particular an audio book, in a motor vehicle, in particular a two- or four-wheeled motor vehicle, wherein the motor vehicle has at least one sensor provided in or on it for picking up driving parameters of the motor vehicle, such as in particular at least one speed, force or acceleration sensor, wherein the method includes the steps of: first comparing whether the driving parameters picked up by the at least one sensor denote a section of road that requires increased attentiveness from the driver of the motor vehicle, and in the event of a positive first comparison, the reproduction of the audio medium is interrupted; second comparing whether the driving parameters picked up by the at least one sensor denote a section of road that requires increased attentiveness from the driver of the motor vehicle, and in the event of a positive second comparison, the reproduction of the audio medium continues to be interrupted, or in the event of a negative second comparison, reproduction of the audio medium is continued.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic flow diagram illustrating an exemplary method according to the invention.

DETAILED DESCRIPTION OF THE DRAWING

Referring to FIG. 1, the invention provides a method for acoustic reproduction of a digital audio medium, in particular an audio book, in a motor vehicle, in particular a two- or four-wheeled motor vehicle, wherein the motor vehicle has at least one sensor. According to the method, while an audio medium is being played (10), the sensor, provided in or on the vehicle, picks up driving parameters (12) of the motor vehicle, such as in particular at least one speed, force or acceleration sensor.

The invention includes the following steps:

In a first step (14), a first comparison is performed for whether the driving parameters picked up by the at least one sensor denote a section of road that requires increased attentiveness from the driver of the motor vehicle.

In the event of a positive first comparison (Y), the reproduction of the audio medium is interrupted in a second step (16).

In a third step (18), a second comparison is performed for whether the driving parameters picked up by the at least one sensor denote a section of road that requires increased attentiveness from the driver of the motor vehicle.

In the event of a positive second comparison (Y), the reproduction of the audio medium continues to be interrupted (16) in a fourth step.

Finally, in the event of a negative second comparison (N), the reproduction of the audio medium is continued (10) in a fifth step.

In known methods, the audio reproduction in motor vehicles is paused for traffic announcements, for calls using a hands-free system or for announcements by a navigation system. After the respective announcements or calls, the music is continued at the point of interruption. Listening to music in the vehicle can reduce the attentiveness of the driver. This applies in particular for audio books, the majority of which are listened to in motor vehicles. In demanding traffic situations, the driver can no longer follow the content of audio books or is greatly distracted from the traffic situation. Accordingly, when listening to audio books, the driver will frequently rewind after the demanding traffic situation has been overcome. This is not user friendly and distracts the driver additionally.

To avoid these disadvantages, the method according to the invention provides, in summary, for the playback of an audio medium and, in particular, of an audio book to be interrupted at hazard spots, sharp curves, in dense urban traffic or in or during all driving situations that require a high level of concentration from the driver. Subsequently, the driver can concentrate fully on the driving task required of him. Once this has been overcome, the invention allows for the playback of the auto medium or of the audio book to be continued, in particular from the point of the pause.

In a preferred embodiment of the method according to the invention, it is provided for the continuation of the reproduction to take place at a point on the audio medium that has already been played back before the interruption to the reproduction. As a result, it is advantageously possible to prevent the driver from beginning to look for the point that he still has in memory, which can involve considerable distraction from the traffic.

In accordance with one development of the method according to the invention, it is provided for the section of road to be a section of road for which the changes of speed of the motor vehicle over time that are determined by the sensors, such as acceleration and deceleration, braking intensity and/or jerky movements transversely and/or longitudinally with respect to the direction of movement of the vehicle, are such that it is detectable that the section of road requires increased attentiveness from the driver of the motor vehicle.

Alternatively or additionally, one embodiment of the method according to the invention has provision for the motor vehicle to have a navigation system provided in it that determines the current geographical position of the vehicle, and the geographical position is assigned at least one first piece of information about the currently travelled section of road, and that processes static map data and/or dynamic traffic data that the navigation system receives from outside the motor vehicle, wherein the map and/or traffic data denote a section of road that requires increased attentiveness from the driver of the motor vehicle.

In accordance with one development of the method according to the invention, there is provision for an interruption to the reproduction of the audio medium to take place only if additionally, on the basis of the static map data and/or dynamic traffic data, it has been verified that the map and/or traffic data denote a section of road that requires increased attentiveness from the driver of the motor vehicle. Conversely, this may also be provided for the continuation of the reproduction.

These measures can further improve the reliability and hence also the acceptance for use of the method according to the invention.

In accordance with one embodiment of the method according to the invention, the section of road that requires increased attentiveness from the driver of the motor vehicle is a hazard spot, such as in particular roadworks, a sharp curve or a narrowing of the road.

In one embodiment of the method according to the invention, it is provided for the section of road that requires increased attentiveness from the driver of the motor vehicle to be a section of road for which the speed of the motor vehicle determined by the at least one sensor and/or by the navigation system is markedly below the permissible speed for the section of road, such as in the case of a congestion situation.

In accordance with an alternative or complementary embodiment of the method according to the invention, there is provision for the section of road to be defined as a section of road for which the changes of speed of the motor vehicle over time that are determined by the at least one sensor and/or by the navigation system, such as acceleration and deceleration, are such that the section of road requires increased attentiveness from the driver of the motor vehicle.

Such sections of road usually require greater attentiveness from the driver and are therefore preferably fully or partially taken into consideration for the performance of the method according to the invention.

Further, the invention provides a driver assistance system for acoustic reproduction of a digital audio medium, in particular an audio book, in a motor vehicle. The motor vehicle has at least one sensor provided in or on it for picking up driving parameters of the motor vehicle, such as in particular at least one speed, force or acceleration sensor. According to the invention, there is provision for the driver assistance system to perform at least one step of a method according to the invention.

Further, the invention provides a motor vehicle having a driver assistance system according to the invention.

Finally, the invention also provides a computer program product for controlling at least one processor that prompts the execution of at least one step of a method according to the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for acoustic reproduction of a digital audio medium in a motor vehicle, wherein the motor vehicle has at least one sensor provided in or on it for picking up driving parameters of the motor vehicle, the method comprising the steps of:
   first comparing whether the driving parameters picked up by the at least one sensor denote a section of road that requires increased attentiveness from the driver of the motor vehicle, and
   in the event of a positive first comparison, the reproduction of the digital audio medium is interrupted, wherein the digital audio medium is an audio book;
   second comparing whether the driving parameters picked up by the at least one sensor denote a section of road that requires increased attentiveness from the driver of the motor vehicle, and
   in the event of a positive second comparison, the reproduction of the digital audio medium continues to be interrupted, or
   in the event of a negative second comparison, reproduction of the digital audio medium is continued, wherein the continuation of the reproduction takes place at a point on the digital audio medium that has already been played back before the interruption to the reproduction.

2. The method as claimed in claim 1, wherein
the at least one sensor is at least one of a speed, force or acceleration sensor.

3. The method as claimed in claim 1, wherein
the section of road is a section of road for which changes of speed of the motor vehicle over time that are determined by the at least one sensor are such that it is detectable that the section of road requires increased attentiveness from the driver of the motor vehicle.

4. The method as claimed in claim 3, wherein
the changes of speed over time determined by the at least one sensor comprises acceleration, deceleration, the braking intensity and/or jerky vehicle movements transversely and/or longitudinally with respect to a direction of movement of the vehicle.

5. The method as claimed in claim 1, wherein
the motor vehicle comprises a navigation system that determines a current geographical position of the vehicle, and
the geographical position is assigned at least one first piece of information about a currently travelled section of road, and
the navigation system processes static map data and/or dynamic traffic data received from outside the motor vehicle, wherein the map and/or traffic data denote a section of road that requires increased attentiveness from the driver of the motor vehicle.

6. The method as claimed in claim 5, wherein
an interruption to the reproduction of the digital audio medium takes place only if additionally, on the basis of the static map data and/or dynamic traffic data, it has been verified that the map and/or traffic data denote a section of road that requires increased attentiveness from the driver of the motor vehicle.

7. The method as claimed in claim 5, wherein
the section of road that requires increased attentiveness from the driver of the motor vehicle is a hazard spot.

8. The method as claimed in claim 7, wherein the hazard spot is one of a sharp curve, a narrowing of the road or a road construction area.

9. The method as claimed in claim 5, wherein the section of road that requires increased attentiveness from the driver of the motor vehicle is a section of road for which a speed of the motor vehicle determined by the at least one sensor and/or by the navigation system is markedly below the permissible speed for the section of road.

10. The method as claimed in claim 5, wherein the section of road is a section of road for which changes of speed of the motor vehicle over time that are determined by the at least one sensor and/or by the navigation system are such that the section of road requires increased attentiveness from the driver of the motor vehicle.

11. A driver assistance system for acoustic reproduction of a digital audio medium in a motor vehicle equipped with at least one sensor for picking up driving parameters of the motor vehicle, comprising a processor and associated memory operatively configured to carry out the acts of:
   first comparing whether the driving parameters picked up by the at least one sensor denote a section of road that requires increased attentiveness from the driver of the motor vehicle, and
   in the event of a positive first comparison, the reproduction of the digital audio medium is interrupted, wherein the digital audio medium is an audio book;
   second comparing whether the driving parameters picked up by the at least one sensor denote a section of road that requires increased attentiveness from the driver of the motor vehicle, and
   in the event of a positive second comparison, the reproduction of the digital audio medium continues to be interrupted, or
   in the event of a negative second comparison, reproduction of the digital audio medium is continued, wherein the continuation of the reproduction takes place at a point on the digital audio medium that has already been played back before the interruption to the reproduction.

12. A motor vehicle, comprising a driver assistance system as claimed in claim 11.

13. A computer program product comprising a non-transitory computer readable medium having stored thereon program code sections that, when executed by a processor, carry out the acts of:
   first comparing whether driving parameters picked up by at least one sensor denote a section of road that requires increased attentiveness from a driver of a motor vehicle, and
   in the event of a positive first comparison, an acoustic reproduction of a digital audio medium is interrupted, wherein the digital audio medium is an audio book;
   second comparing whether the driving parameters picked up by the at least one sensor denote a section of road that requires increased attentiveness from the driver of the motor vehicle, and
   in the event of a positive second comparison, the reproduction of the digital audio medium continues to be interrupted, or
   in the event of a negative second comparison, reproduction of the digital audio medium is continued, wherein the continuation of the reproduction takes place at a point on the digital audio medium that has already been played back before the interruption to the reproduction.

* * * * *